United States Patent [19]

Maeda et al.

[11] Patent Number: 4,848,627
[45] Date of Patent: Jul. 18, 1989

[54] STORAGE BOX FOR VEHICLES

[75] Inventors: Yoshihiro Maeda; Manabu Morisaka, both of Toyota; Hisayoshi Matsumoto, Toyoake, all of Japan

[73] Assignees: Toyota Jidosha Kabushiki Kaisha; Kojima Press Industry Co., Ltd., both of Toyota, Japan

[21] Appl. No.: 110,527

[22] Filed: Oct. 20, 1987

[30] Foreign Application Priority Data

Oct. 21, 1986 [JP] Japan .................................. 61-161110

[51] Int. Cl.⁴ .............................................. B60R 7/04
[52] U.S. Cl. ........................................ 224/275; 108/44; 224/42.42; 248/311.2
[58] Field of Search ........................ 206/335, 562, 563; 224/42.42, 273, 275, 282; 108/44; 211/74; 248/311.1, 311.2

[56] References Cited

U.S. PATENT DOCUMENTS

| | | | |
|---|---|---|---|
| 2,875,940 | 3/1959 | Dunn ..................................... | 206/562 |
| 3,542,280 | 11/1970 | Crabtree ......................... | 206/563 X |
| 3,842,981 | 10/1974 | Lambert ................................ | 211/74 |
| 4,020,986 | 5/1977 | McAtee ............................ | 224/42.42 |
| 4,106,829 | 8/1978 | Dolle et al. ..................... | 224/275 X |
| 4,659,099 | 4/1987 | Malone ............................. | 108/44 X |
| 4,738,423 | 4/1988 | Di Filippo et al. .............. | 248/311.2 |

FOREIGN PATENT DOCUMENTS

| | | |
|---|---|---|
| 52-248525 | 11/1977 | Japan . |
| 58-110551 | 7/1983 | Japan . |
| 58-115444 | 8/1983 | Japan . |
| 58-156046 | 10/1983 | Japan . |
| 60-21299 | 6/1985 | Japan . |
| 60-39300 | 11/1985 | Japan . |

Primary Examiner—J. R. Scott
Attorney, Agent, or Firm—Cushman, Darby & Cushman

[57] ABSTRACT

A storage box for vehicles having a box main body for the storage, a lid body supported by the box main body in such a manner that it can be opened and closed, and an inner lid disposed between the box main body and the lid body. With this arrangement of the storage box, it is possible to open and close the inner lid independently from the lid body. It is also possible to bring the lid body and the inner lid into engagement with each other in such a manner that they are movable relative to each other, so that the lid body and the inner lid can be opened and closed integrally. Thus, an inner lid is provided while eliminating any risk of adversely affecting the fitting of the lid body. The inner lid is also provided with at least one through-hole for receiving a container. A support member is rotatably mounted to the inner lid for supporting the bottom of the container.

18 Claims, 5 Drawing Sheets

STORAGE BOX FOR VEHICLES

BACKGROUND OF THE INVENTION

1. Field of the Invention

The present invention relates to a storage box such as a console box installed in vehicles, particularly, automobiles.

2. Description of the Related Art

Console boxes installed in automobiles have been provided with an inner lid on the inside of the console box door. FIG. 6 shows a conventional structure of a console box of this type (Japanese Utility Model Laid-Open No. 115444/1983). In a console box 10 as shown in FIG. 6, a recess 14 is formed in an inner lid 12 so that small articles can be stored in the space between the inner lid 12 and a console box door 16. The inner lid 12 has at one end thereof a thin-walled hinge portion 18 formed therein, and an end of this thin-walled hinge portion 18 is fixed to a box main body 22 by screws 20, thereby mounting the inner lid 12 to the box main body 22 in such a manner that the inner lid 12 can be opened and closed when rotated about the axis of rotation 18A on the thin-walled hinge portion 18. The console box door 16 is mounted to a cylindrical portion 24, formed in the inner lid 12, by a pin 26 passing through the cylindrical portion 24 so that the console box door 16 can be opened and closed when rotated about the pin 26. The console box door 16 has a magnet 28 impregnated therein. The inner lid 12 has a piece of iron 30 which can be attracted by the magnet 28, so that the console box door 16 and the inner lid 12 can be brought into engagement with each other in such a manner that they can be integrally opened and closed when rotated about the axis of rotation 18A on the thin-walled hinge portion 18. A lock member 32 is provided for bringing the inner lid 12 into engagement with the box main body 22, so that the console box door 16 and the inner lid 12 can be integrally brought into engagement with the box main body 22.

When the console box door 16 alone is lifted upward from its closed position shown in FIG. 6, since the inner lid 12 is kept in engagement with the box main body 22 by the lock member 32, the magnet 28 is separated from the piece of iron 30, thereby allowing only the console box door 16 to be rotated about the pin 26 and thus to be opened. This makes it possible to store small articles in the recess 14. When the lock member 32 is operated to disengage the console box door and the inner lid from the box main body 22, and, thereafter, when the disengaged members are rotated by lifting the console box door 16 upward as viewed in FIG. 6, the inner lid 12 and the console box door 16 are integrally opened by virtue of the attraction between the magnet 28 and the piece of iron 30. This makes it possible to store small articles in the box main body 22.

The above-described console box 10 is constructed such that the inner lid 12 is mounted to the box main body 22 and the console box door 16 is mounted to this inner lid 12 by the pin 26, thus mounting the console box door 16 indirectly to the box main body 22. However, this construction provides poor fitting of the console box door 16 in comparison with a console box door 16 which is directly mounted to the box main body 22. In addition, since the console box door 16 is mounted to the inner lid 12, a notch 34 as shown in FIG. 6 has to be provided in order to keep the console box door 16, in the opening action, from interfering with the inner lid 12 which is closed. Since this arrangement creates a relatively large gap between the console box door 16 and the box main body 22, the exterior appearance of the console box 10 may be spoiled.

These problems can be solved by providing a thin-walled hinge portion 36, as shown in FIG. 7, which is formed at one end of the console box door 16, to mount the console box door 16 directly to the box main body 22 with a screw 38, and by mounting the inner lid 12 to this console box door 16 by a pin 40 (Japanese Utility Model Laid-Open No. 110551/1983). With such a structure, however, when the console box door 16 is rotated to open or close the door 16 alone, the pin 40 is also rotated about the axis of rotation 36A on the thin-walled hinge portion 36. This may cause vibration of the inner lid 12 when the console box door 16 is being opened or closed while the inner lid 12 is kept closed. Consequently, in the event that the console box door 16 happens to be rotated from its opened position while the inner lid in the closed state is used as, for example, a cup rest, there is a risk that the inner lid 12 may vibrate and the content of the cups may get spilled.

The art of providing an inner lid in a console box so as to use the inner lid as a cup rest is disclosed in Japanese Utility Model Publication No. 48525/1977, Japanese Utility Model Publication No. 393000/1985, Japanese Utility Model Publication No. 21299/1985, and Japanese Utility Model Laid-Open No. 156046/1983. However, these proposals have encountered the following problems. The operation required for using the inner lid as a cup rest is complicated (Japanese Utility Model Publication No. 48525/1977 and Japanese Utility Model Publication No. 39300/1985). There is a risk that the content of the cups may be spilled because of vibration of the inner lid when the console box door vibrates owing to factors such as vibration of the vehicle (Japanese Utility Model Publication No. 39300/1985). With the proposal disclosed in Japanese Utility Model Publication No. 21299/1985, the inner lid can not be opened integrally with the console box door during normal use, and the operation during normal use is complicated. With the proposal disclosed in Japanese Utility Model Laid-Open No. 156046/1983, since, the inner lid is used as a cup rest, it is adapted to support cups at a location which is above the console box door opened through 180 degrees and which is remote from persons seated in the driver's seat and the adjacent front seat, this arrangement provides poor usability; in addition, the structure is complicated, requiring high production costs.

SUMMARY OF THE PRESENT INVENTION

In view of the above-mentioned circumstances, it is an object of the present invention to provide a storage box for vehicles which is provided with an inner lid without involving any adverse affect on the fitting of a lid body such as a console box door, which enables the inner lid to be opened integrally with the lid body, and which is capable of keeping the inner lid from being moved by the opening and closing action of the lid body even when the lid body is opened or closed while the inner lid is kept closed.

According to the present invention, there is provided a storage box for vehicles comprising: a box main body having a storage portion; a lid body supported by the box main body through first hinge means in such a manner that the lid body can be opened and closed; an inner lid disposed between the box main body and the lid body and supported by the box main body through second hinge means provided closer to the storage portion than the first hinge means, the inner lid being supported in such a manner that it can be opened and closed in the same direction as the lid body independently from the lid body; and engagement means provided in the lid body and the inner lid for bringing the lid body and the inner lid into engagement in such a manner that they can be opened and closed together.

With the above-stated structure of the storage box for vehicles in accordance with the present invention, the lid body and the inner lid are independently mounted to the box main body through the first and second hinges, respectively. Therefore, they can be opened and closed, thereby avoiding any deterioration in the fitting of the lid body. During the normal use, the lid body and the inner lid are opened and closed integrally while they are kept in engagement by the engagement means. The inner lid can be used as a rest for supporting small articles and cups when it is brought into a horizontal position by operating the engagement means to disengage the inner lid after, for instance, it has been opened together with the lid body. When the inner lid is used as a rest for supporting small articles or cups, since the lid body and the inner lid are independently mounted to the box main body in such a manner that they can be opened or closed, the inner lid does not vibrate even when the lid body vibrates owing to vibration of the vehicle, thereby preventing a risk of the content of the cups spilling or a similar risk.

Thus, with the storage box in accordance with the present invention, an inner lid can be provided without involving any adverse affect on the fitting of the lid body, the inner lid can be opened integrally with the lid body, and the inner lid can be kept still during the opening and closing of the lid body even when the lid body is opened or closed.

DESCRIPTION OF THE PREFERRED EMBODIMENT

FIGS. 1 to 5 illustrate a console box 100 in accordance with the present invention.

Figure 1:
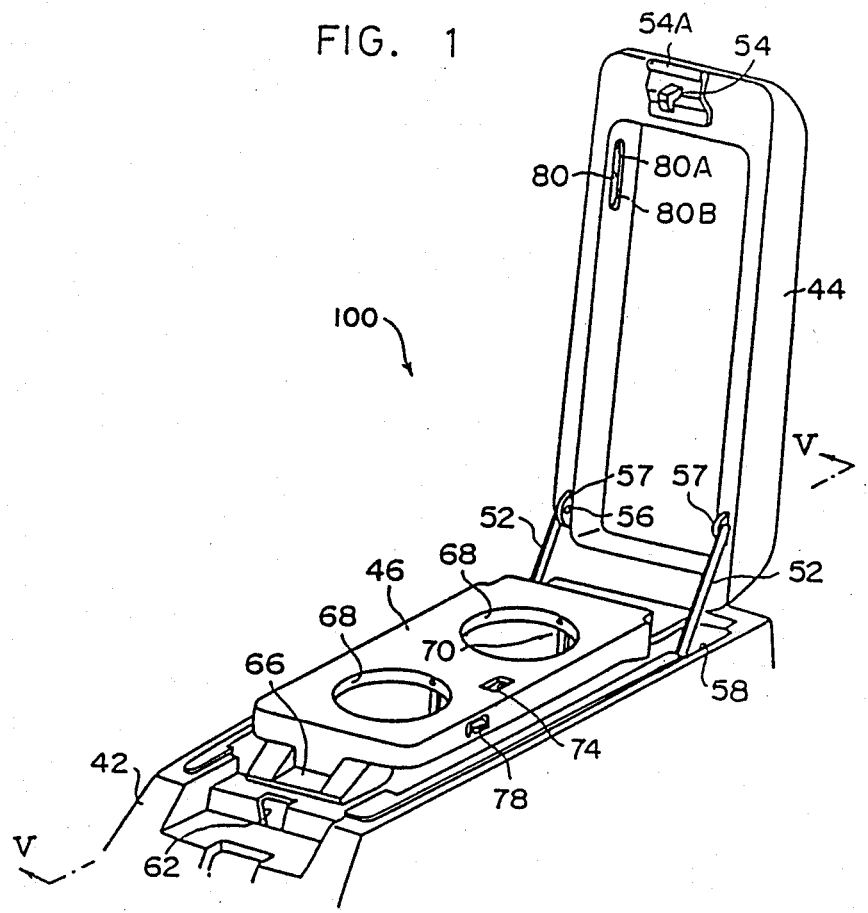
FIG. 1 is a perspective view of a storage box for vehicles in accordance with an embodiment of the present invention.

As shown in FIG. 1, the console box 100 mainly comprises a box main body 42, a console box door 44 which serves as the lid body, and an inner lid 46.

Figure 2:
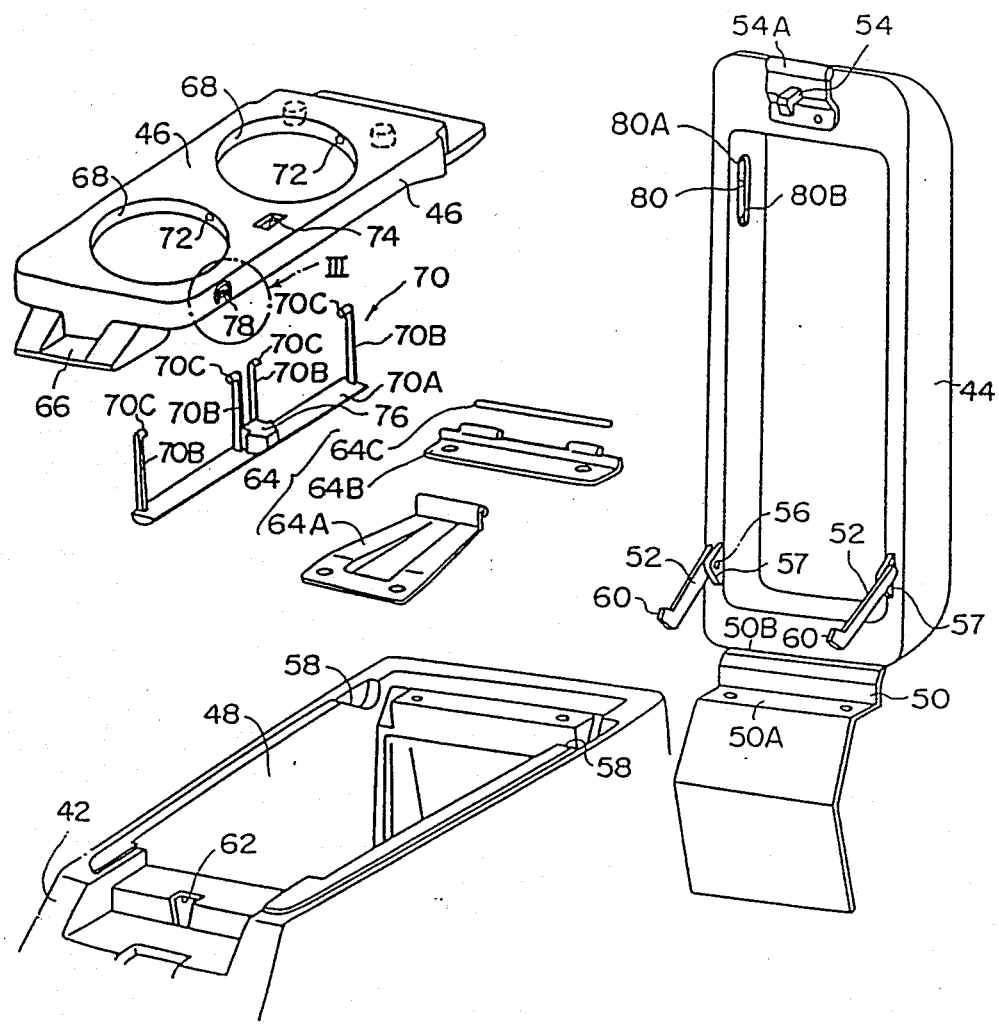
FIG. 2 is an exploded perspective view of the storage box shown in FIG. 1.

The box main body 42 has a storage recess 48, as shown in FIG. 2, which is formed therein at a substantially central location thereof and opening upward in a generally rectangular shape, so as to be capable of storing small articles in the storage recess 48.

Figure 4:
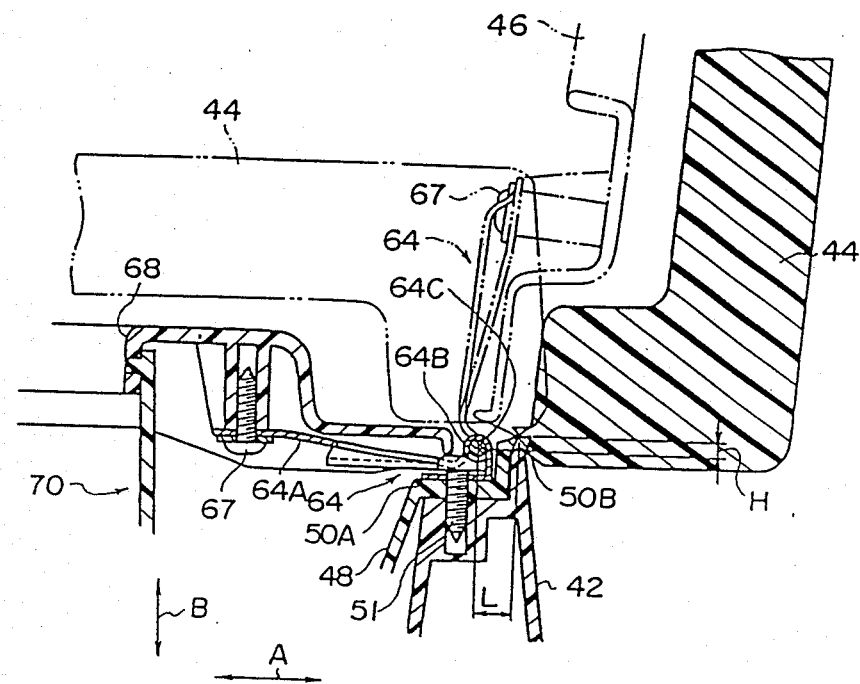
FIG. 4 is a fragmentary sectional view through the portions of a console box door and an inner lid at which they are mounted to a box main body.

Also as shown in FIG. 2, the console box door 44 has at one end thereof a thin-walled hinge portion 50 which serves as a first hinge. The mounting portion 50A of this thin-walled hinge portion 50 is secured to an upper surface of the box main body 42 by screws 51, as shown in FIG. 4, so that the console box door 44 is mounted to the box main body 42 in such a manner that it can be opened and closed when rotated about the axis of rotation 50B on the thin-walled hinge portion 50. The console box door 44 has check arms 52 and a lock member 54, as described below.

Each of the check arms 52 has at one end thereof a shaft 56 which is formed integrally therewith and rotatably supported by a shaft support 57 of the console box door 44. The other ends of the check arms 52 are inserted into holes 58 formed in the box main body 42 so as to impart an adequate amount of resistance to the opening and closing of the console box door 44. The tips of the other ends of the check arms 52 have stopper portions 60, as shown in FIG. 2, which serve to limit the maximum opening amount of the console box door 44.

The lock member 54 is fixed to the end portion of the console box door 44 that is remote from the thin-walled hinge portion 50. This lock member 54 is engageable with an engagement hole 62 formed in the box main body 42 so that the console box door 44 can be closed in a condition of being locked onto the box main body 42. The engagement between the lock member 54 of the console box door 44 and the engagement hole 62 of the box main body 42 can be released by lifting an operating portion 54A of the lock member 54 thereby disengaging the lock member 54 from the engagement hole 62.

The inner lid 46 is mounted to the box main body 42 by a metal hinge 64 which serves as a second hinge. The hinge 64 comprises, as shown in FIG. 2, hinge plates 64A and 64B, and a hinge pin 64C connecting these hinge plates 64A and 64B rotatable relative to each other. As shown in FIG. 4, the hinge plate 64A is secured to an end portion of the inner lid 46 by screws 67, while the hinge plate 64B is secured to the box main body 42 by the screws 51 together with the thin-walled hinge portion 50. By virtue of the provision of this hinge 64, the inner lid 46 is capable of opening and closing in the same direction as the console box door 44 independent of the console box door 44 when rotated about the hinge pin 64C. As shown in FIG. 4, the hinge pin 64C is separated from the axis of rotation on the thin-walled hinge portion 50 inwardly of the box main body 42 by a length L in the horizontal direction (i.e., in the direction indicated by the arrow A shown in FIG. 4) and is separated therefrom downwardly by a height H in the vertical direction (i.e., in the direction indicated by the arrow B shown in FIG. 4).

Figure 5:
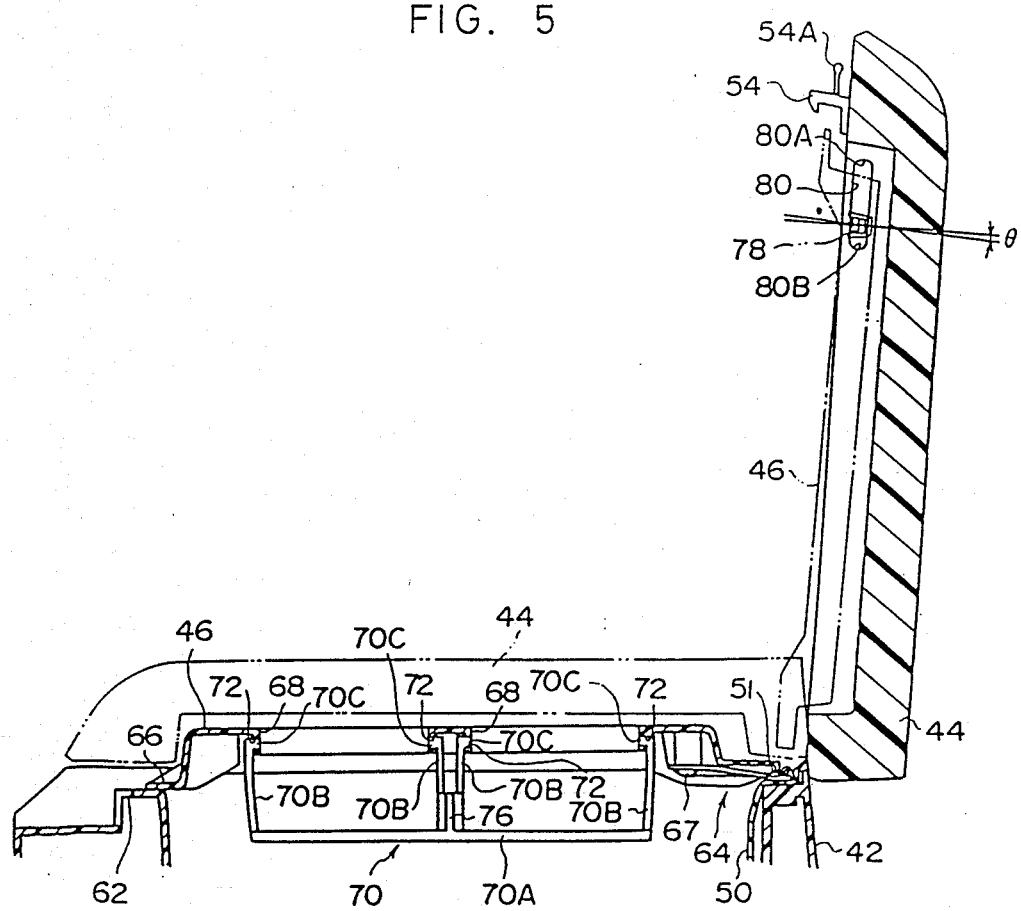
FIG. 5 is a fragmentary partly sectional view of the storage box taken along the line V—V shown in FIG. 1.
Figure 6:
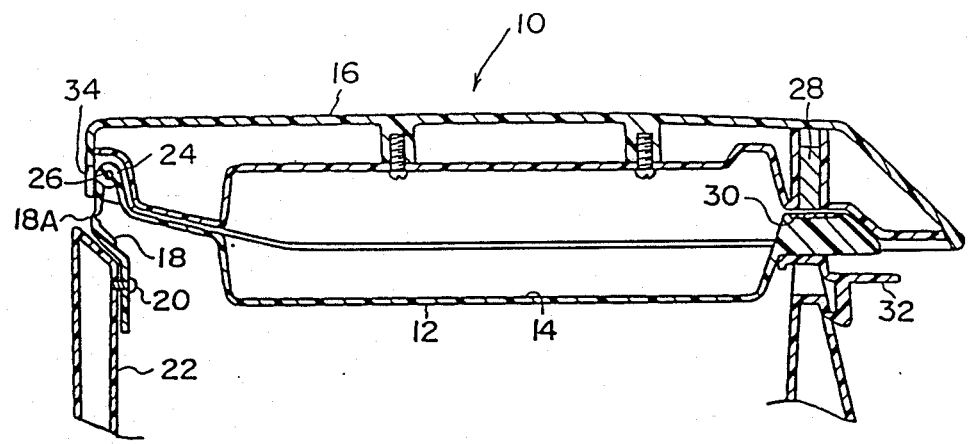
FIGS. 6 and 7 are sectional views through the mounting portions provided on an inner lid of a conventional console box.
Figure 7:
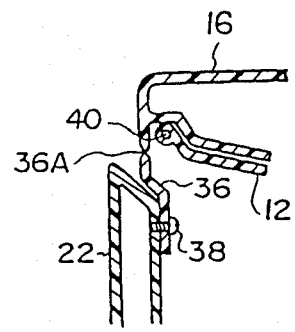

As shown in FIG. 5, a contact portion 66 is formed in the portion of the inner lid 46 that is remote from the mounting portion where the hinge 64 is disposed. This contact portion 66 can be brought into contact with an upper surface of the box main body 42 when it is moved to the substantially horizontal position, so as to be supported substantially horizontally by the box main body 42 when the inner lid 46 is in the closed condition.

Two container insertion holes 68 are formed through the central portion of the inner lid 46. Also, as shown in FIG. 5, a support 70 is mounted on the inner side of the inner lid 46. More specifically, as shown in FIGS. 2 and 5, the support 70 has a supporting plate 70A, and four legs 70B projecting normally from the supporting plate 70A and each having at its tip a shaft portion 70C. These shaft portions 70C are inserted into holes 72, as shown in FIG. 5, which are formed in the inner periphery of the container insertion holes 68, so that the support 70 is supported by the inner lid 46 in such a manner as to be rotatable about the shaft portions 70C. The supporting plate 70A has a pawl 76 which is engageable with a rectangular hole 74 formed in the inner lid 46. When the pawl 76 is brought into engagement with the rectangular hole 74 by rotating the support 70 about the shafts 70C, the support 70 will be integral with the inner lid 46. The engagement between the pawl 76 and the rectangular hole 74 can be released easily by depressing the pawl 76 in the direction opposite to that in which the pawl 76 is inserted into the rectangular hole 74.

The inner lid 46 and the console box door 44 described above can be brought into engagement with each other by engagement projections 78 which are formed on the longitudinal side walls of the inner lid 46 and serve as the engaging element forming a part of the engagement means, and by engagement grooves 80 formed on the inner side of the longitudinal side walls of the console box door 44 and serve as the engagement receptacle element forming the other part of the engagement means.

Figure 3:
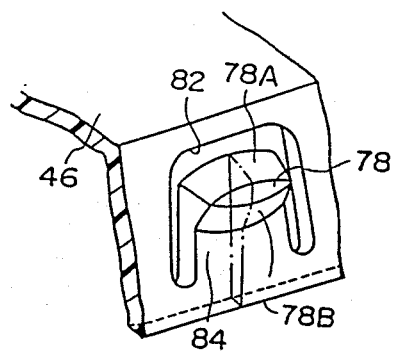
FIG. 3 is an enlarged perspective view of a part of the storage box which is indicated by a circle III in FIG. 2.

As shown in FIG. 3, each of the engagement projections 78 projects toward the outside of the inner lid 46 from the free-end portion of a cantilevered plate portion 84 partly defined by a U-shaped slit 82, so that it can be displaced toward the inside of the inner lid 46 by elastic deformation of the cantilevered plate portion 84. Each of the engagement projections has two surfaces 78A and 78B formed on the top and bottom sides thereof in the direction of height of the corresponding side wall of the inner lid 46. These two surfaces 78A and 78B are formed as surfaces which are inclined in opposite directions and describe circular-arcs as viewed from the direction in which the engagement projection 78 projects. The arrangement of the engagement projections 78 is such that the surfaces 78A will be brought into contact with the bottom and innner surfaces of the longitudinal side walls of the console box door 44 when the console box door 44 is closed from the condition of the storage box in which the console box door 44 is open while the inner lid 46 alone is closed (i.e., from the condition shown in FIG. 1), or when the inner lid 46 is opened from the condition shown in FIG. 1.

Each of the engagement grooves 80 formed as an elongated groove which is elongated in the longitudinal direction of the side walls of the console box door 44. The arrangement of the engagement grooves 80 is such that, when the console box door 44 is closed from the condition in which the console box door 44 is open while the inner lid 46 alone is closed (i.e., from the condition shown in FIG. 1), the engagement projections 78 are mated with the groove end portions 80A that are remote from the thin-walled hinge portion 50. The arrangement is also such that, when the inner lid 46 is opened from the above-mentioned condition in which the inner lid 46 is closed while the console box door 44 alone is opened, the engagement projections 78 are mated, this time, with the other groove end portion 80B which is opposite to the groove end portion 80A, because the hinge pin 64C acting as the axis of rotation of the the inner lid 46 is disposed lower by the height H than the axis of rotation 50B of the thin-walled hinge portion 50, which acts as the axis of rotation of the console box door 44.

The engagement grooves 80 and the engagement projections 78 are capable of bringing the console box door 44 and the inner lid 46 into engagement when the console box door 44 is fully closed from the condition in which the console box door 44 is open while the inner lid 46 alone is closed (i.e., from the condition shown in FIG. 1). More specifically, when the console box door 44 is closed from the above-mentioned condition, surfaces of the longitudinal side walls of the console box door 44 come into contact with the surfaces 78A of the engagement projections 78, and the inclination of the surfaces 78A allows the engagement projections 78 to be temporarily displaced toward the inside of the inner lid 46 by the closing action of the console box door 44. By this action, the engagement projections 78 enter the groove end portions 80A of the engagement grooves 80, thereby engaging the console box door 44 and the inner lid 46 with each other.

The console box door 44 and the inner lid 46 can also be brought into engagement when the inner lid 46 is fully opened from the above-mentioned condition in which the console box door 44 alone is open while the inner lid 46 is closed. More specifically, when the inner lid 46 is opened from the above-mentioned condition, the surfaces 78A of the engagement projections 78 come into contact with surfaces of the longitudinal side walls of the console box door 44, and the inclination of the surfaces 78A allows the engagement projections 78 to be temporarily displaced toward the inside of the inner lid 46 by the opening action of the inner lid 46. By this action, the engagement projections 78 enter the groove end portions 80B of the engagement grooves 80, thereby engaging the console box door 44 and the inner lid 46 with each other (See FIG. 5). At this point, since the hinge pin 64C is separated from the axis of rotation 50B of the thin-walled hinge portion 50 by the length L in the horizontal direction, the central axis of each of the engagement projections 78 when it is engaged deviates by an angle $\theta$ from a line normal to the longitudinal direction of the corresponding engagement groove 80. However, since each of the surfaces 78A and 78B of the engagement projections 78 is formed as a circular-arc surface, the engagement projections 78 can securely enter the engagement grooves 80 even with this angular deviation with respect to the engagement grooves 80.

The surfaces 78A and 78B of the engagement projections 78 are formed as circular-arced surfaces which enable rocking movement of the engagement projections 78 relative to the engagement grooves 80, and the engagement grooves 80 are formed as elongated grooves which allow movement of the engagement projections 78 within the engagement grooves 80 relative thereto in the longitudinal direction. Because of this arrangement, the engagement between the console box door 44 and the inner lid 46 is not released even when they are opened together by lifting the console box door 44 after the console box door 44 has been fully closed so as to be brought into engagement with inner lid 46 in the closed state, or when they are closed together by pushing down the console box door 44 after the inner lid 46 has been fully opened and brought into engagement with the console box door 44 in the open state.

The engagement between the console box door 44 and the inner lid 46 is released when they are pulled relatively away from each other. More specifically, when the inner lid 46 and the console box door 44 are pulled relatively away from each other, the surfaces 78B of the engagement projections 78 are brought into contact with the inner wall of the engagement grooves 80 and are temporarily displaced toward the inside of the inner lid 46 by virtue of the inclination of the surfaces 78B so as to be disengaged from the engagement grooves 80. This action releases the engagement between the console box door 44 and the inner lid 46.

The operation of the storage box in accordance with the embodiment of the present invention will now be described.

FIGS. 1 and 5 (in solid lines) show the condition of the storage box in which the console box door 44 is opened while the inner lid 46 alone is kept closed. With this condition, the inner lid 46 is held substantially horizontally and, at the same time, the support 70 hangs down under its own weight below the inner lid 46 in such a manner that the supporting plate 70A of the support 70 crosses the container insertion holes 68 in the diametrical direction below the inner lid 46. With this condition, therefore, the inner lid 46 can be used as a rest for supporting containers.

When the inner lid 46 is to be used as a container rest, containers, such as cups, are inserted through the container insertion holes 68. The bottoms of the containers, such as cups, which have been inserted through the container insertion holes 68 are in contact with the supporting plate 70A of the support 70 and, simultaneously, the outer peripheral walls of these containers are in contact with the inner peripheral walls of the container insertion walls 68, thereby limiting movement of the containers in the radial direction. Thus, the containers can be securely supported without any excessive play.

While the containers are thus held in place, since the inner lid 46 is independently mounted to the box main body 42 by the hinge 64, the weight of the containers does not act on the portion of the thin-walled hinge portion 50 that relates to the opening/closing function of the console box door 44. This feature is advantageous in terms of the strength of the thin-walled hinge portion 50.

If the console box door 44 happens to be rotated from the above-mentioned position in the closing direction, the inner lid 46, which is independently supported by the box main body 42, is kept from being moved in the horizontal or vertical direction by the rotation of the console box door 44. Therefore, even when the console box door 44 vibrates owing to a factor such as vibration of the vehicle, the inner lid 46 is kept from vibrating together with the console box door 44, thereby enabling the containers such as cups to be positively supported in a stable condition.

After the inner lid 46 has been used as a cup rest, when the console box door 44 is fully closed from its position shown in FIG. 1 and indicated by the solid lines in FIG. 5 to a position thereof as indicated by the two-dot chain lines in FIG. 5, the closing action of the console box door 44 causes the engagement projection 78 to enter the groove end portions 80A of the engagement grooves 80, so that the console box door 44 is brought into engagement with the inner lid 46 to be integral therewith. Simultaneously, the closing action of the console box door brings the lock member 54 into engagement with the engagement hole 62 of the box main body 42, so that the console box door 44 integral with the inner lid 46 is closed and is locked onto the box main body 42.

When small articles are to be stored in the storage recess 48 of the box main body 42 while the storage box is in the above-mentioned condition, the console box door 44 integral with the inner lid 46 is opened. This opening can be achieved by lifting the operating portion 54A of the lock member 54, thereby releasing the lock member 54 from its engagement with the engagement hole 62. When the console box door 44 is thus opened, the inner lid 46 is opened together with its engagement projections 78 being kept within the engagement grooves 80, thereby enabling small articles to be stored in the storing recess 48. In this opening action, each of the engagement projections 78 moves from the corresponding groove end portion 80A toward the other groove end portion 80B within the engagement groove 80 with angular deviation with respect to the engagement groove 80. If the pawl 76 of the support 70 is inserted into the rectangular hole 74 of the inner lid 46 and is thus engaged therewith, the support 70 will not represent any obstacle to the operation of storing article in the storing recess 48, as will be seen from the two-dot chain lines on the right hand side of FIG. 5.

With this condition of the storage box, when the console box door 44 and the inner lid 48 are pulled relatively away from each other, the engagement projections 78 become disengaged from the engagement grooves 80, thereby releasing the engagement between the console box door 44 and the inner lid 46. After this engagement has thus been released, when only the inner lid 46 is closed, and, thereafter, when the engagement between the pawl 76 and the rectangular hole 74 is released by depressing the pawl 76, the storage box is brought into the condition in which the inner lid 46 can be used as a cup rest (i.e., the condition shown in FIG. 1 and FIG. 5 (in solid lines).

As described above, with the storage box for vehicles in accordance with the present invention, simple operation can bring the storage box into a condition in which the inner lid 46 can be used as a cup rest. In addition, the storage box is simple in structure, requiring low costs.

Further, in accordance with the invention, since the inner lid 46 is independently mounted to the box main body 42 by means of the hinge 64, the fittings of the console box door 44 is kept from being adversely affected by the provision of the inner lid 46.

Although in the foregoing embodiment, the engagement projections 78 are formed on the inner lid 46 and the engagement grooves 80 are formed on the console box door 44, this is not limitative. Instead, the engagement projections may be provided on the console box door and the engagement grooves may be provided in the inner lid.

While the invention has been described in connection with what is presently considered to be the most practical and preferred embodiment, it is to be understood that the invention is not limited to the disclosed embodiment but, on the contrary is intended to cover various modifications and equivalent arrangements included within the spirit and scope of the appended claims. Therefore, persons of ordinary skill in the art are to understand that all such equivalent structures are to be included within the scope of the following claims.

What is claimed is:

1. A storage box comprising:
   a box body having a storage portion;
   a lid body mounted with first hinge means to said box body so as to be movable relative to said box body about said first hinge means;

an inner lid mounted to said box body with second hinge means which are disposed on said box body so as to be closer to said storage portion than said first hinge means so that said inner lid is disposed between said box body and said lid body, said inner lid being mounted so as to be movable relative to said box body about said second hinge means in the same direction as said lid body;

first engaging means provided in one of said lid body and said inner lid; and second engaging means provided in the other of said lid body and said inner lid, said first engaging means and said second engaging means being selectively engagable with each other, said lid body and said inner lid being movable together when said first engaging means and said second engaging means are engaged, said lid body and said inner lid being separately movable when said first engaging means and said second engaging means are disengaged.

2. A storage box according to claim 1, wherein said storage box is designed to be used in vehicles and said first engaging means comprises an engaging element and said second engaging means comprises an engagement receptacle element for receiving said engaging element.

3. A storage box for vehicles according to claim 2, wherein said engaging element allows movement of said lid body and said inner lid relative to each other when said engaging element and said engagement receptacle element are engaged while maintaining said lid body and said inner lid in engagement with each other.

4. A storage box for vehicles according to claim 2, wherein said engaging element comprises engagement projections and said engagement receptacle element comprises engagement grooves for receiving said engagement projections.

5. A storage box for vehicles according to claim 4, wherein each of said engagement grooves is substantially formed into an elliptical shape elongated substantially along a longitudinal axis of said one of said lid body and said inner lid.

6. A storage box for vehicles according to claim 4, wherein each of said engagement projections is formed on a cantilevered plate defined in said one of said lid body and said inner lid and capable of elastic deformation.

7. A storage box according to claim 6, wherein each of said engagement projections has first and second surfaces formed along a longitudinal axis of said one of said lid body and said inner lid, said surfaces being circular-arc surfaces describing circular arcs as viewed from a direction in which the engagement projection projects.

8. A storage box for vehicles according to claim 7, wherein said surfaces of each of said engagement projections are inclined relative to the direction in which the engagement projection projects in opposite directions.

9. A storage box for vehicles according to claim 1, wherein said inner lid has at least one through-hole formed therein for receiving a container.

10. A storage box for vehicles according to claim 9, further comprising a support member rotatably supported by said inner lid, said support member being rotatable between a first position at which said support member supports a bottom of the container received in said at least one through-hole and a second position at which said support member is fixed to said inner lid.

11. A storage box for vehicles comprising:
a box main body having a storage recess portion having a substantially rectangular shape and opening upwardly;

a lid body mounted to an upper surface of said box main body with first hinge means so as to be movable relative to said lid body about said first hinge means;

an inner lid mounted to an upper surface of said box main body with second hinge means disposed closer to said storage recess portion than said first hinge means so that said inner lid is disposed between said box main body and said lid body, said inner lid being movable relative to said box main body about said second hinge means in the same direction as said lid body and independently of said lid body;

first engaging means provided in one of said lid body and said inner lid; and second engaging means provided in the other of said lid body and said inner lid, said first engaging means and said second engaging means being selectively engagable and disengagable so that when said first engaging means and said second engaging means are engaged, said lid body and said inner lid are movable together and when said first engaging means and said second engaging means are disengaged, said lid body and said inner lid are independently movable.

12. A storage box for vehicles according to claim 11, wherein said first engaging means comprises engagement projections and said second engaging means comprises engagement grooves for receiving said engagement projections.

13. A storage box for vehicles according to claim 12, wherein each of said engagement grooves is an elliptically shaped groove extending substantially along longitudinal axis of said one of said lid body and said inner lid.

14. A storage box for vehicles according to claim 12, wherein each of said engagement projections is formed on a cantilevered plate defined in said one of said lid body and said inner lid and is capable of elastic deformation.

15. A storage box according to claim 14, wherein each of said engagement projections has first and second surfaces formed along a longitudinal axis of said one of said lid body and said inner lid, said surfaces being circular-arc surfaces describing circular arcs as viewed from a direction in which the engagement projection projects.

16. A storage box for vehicles according to claim 15, wherein said surfaces of each of said engagement projections are inclined relative to the direction in which the engagement projection projects in opposite directions.

17. A storage box for vehicles according to claim 11, wherein said inner lid has at least one through-hole formed therein for receiving a container.

18. A storage box for vehicles according to claim 17, further comprising a support member rotatably supported by said inner lid, said support is rotatable between a first position at which said support member supports a bottom of the container received in said at least one through-hole and a second position at which said support member is fixed to said inner lid.

* * * * *